United States Patent

[11] 3,601,920

[72] Inventor Philip Steiner Mason, Jr.
 1810 S. 2nd, Tucumcari, N. Mex. 88401
[21] Appl. No. 9,348
[22] Filed Feb. 6, 1970
[45] Patented Aug. 31, 1971

[54] FISHING PLUG RETRIEVER
 10 Claims, 3 Drawing Figs.
[52] U.S. Cl. ..................................................... 43/17.2,
 43/5, 294/66
[51] Int. Cl. ....................................................... A01k 97/00
[50] Field of Search ............................................ 43/17.2, 5;
 294/66

[56] References Cited
 UNITED STATES PATENTS
Des. 219,145 11/1970 Howerter............ 43/17.2 UX

| 2,210,271 | 8/1940 | Thwaits...................... | 43/5 |
| 2,676,430 | 4/1954 | Richard...................... | 43/17.2 |
| 2,732,650 | 1/1956 | Passmore et al. ............. | 43/17.2 |
| 2,764,833 | 10/1956 | Clark............................ | 43/17.2 |
| 2,801,489 | 8/1957 | Gehring...................... | 43/17.2 |
| 3,360,292 | 12/1967 | Trammell.................... | 43/17.2 X |
| 3,464,138 | 9/1969 | Lindner...................... | 43/17.2 |

*Primary Examiner*—Samuel Koren
*Assistant Examiner*—Daniel J. Leach
*Attorney*—Cushman, Darby & Cushman ABSTRACT: A fishing plug retriever comprising a flexible, annular chain having a plurality of interconnected links and having cord means secured thereto for manipulating the chain down to an entangled fishing plug after the chain has been slipped over the fishing pole.

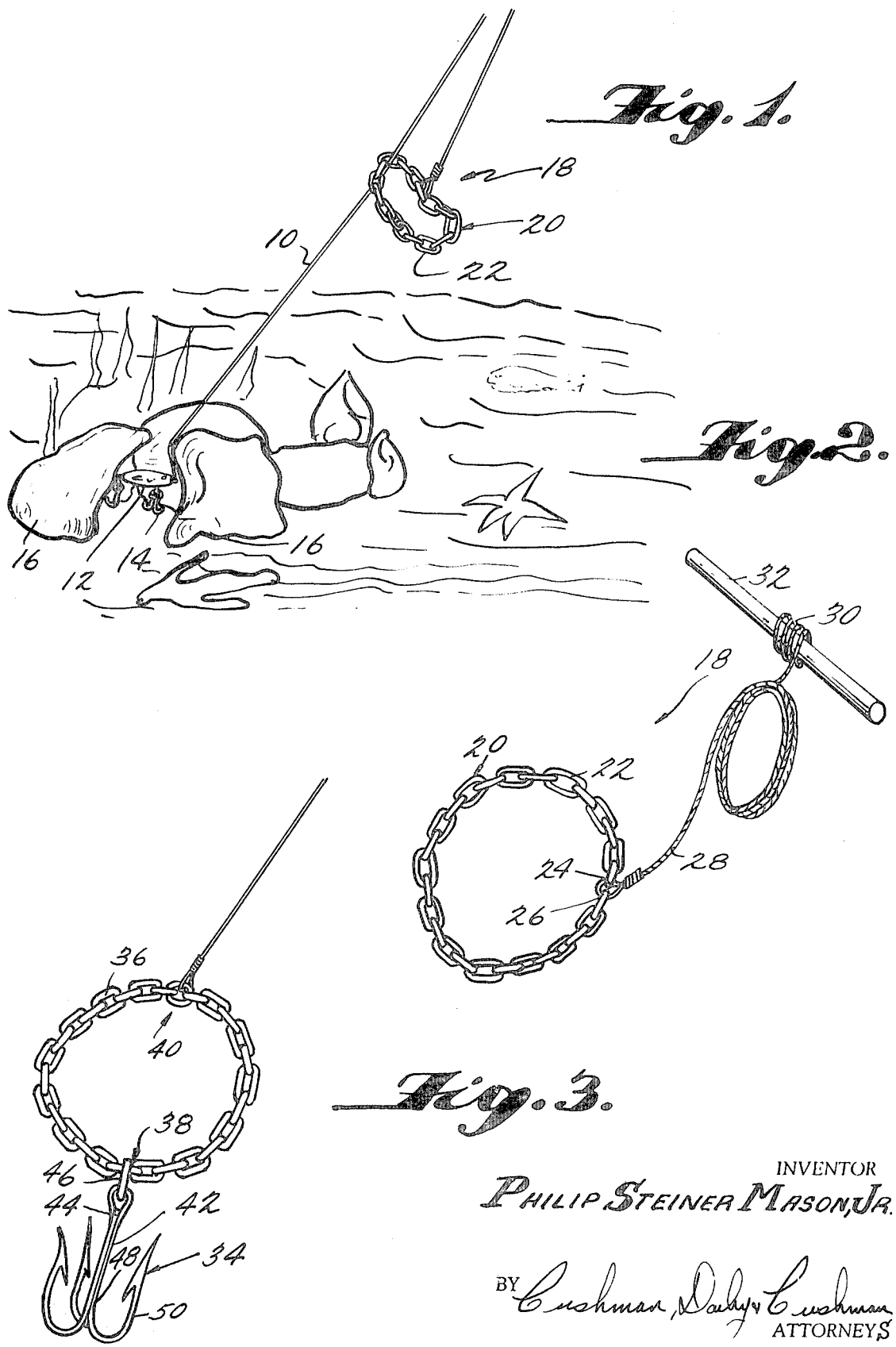

FISHING PLUG RETRIEVER

BACKGROUND OF THE INVENTION

This invention relates to fishing equipment, and more particularly to a retriever for snagged or fouled fishing plugs or lures.

A fisherman's plight occurs when his favorite fishing plug or lure is firmly caught on an obstruction at the bottom of a lake or a river. To this end, numerous devices have been derived for retrieving such plugs. For instance, a typical retriever is disclosed in U.S. Pat. No. 2,494,012; however, in actual use, this retriever tends to twist around the fishing line which, in some cases, prevents the retriever from descending to the snagged plug and, in other cases, breaks the fishing line during retrieving. Other retrieval devices include rigid rings such as disclosed in U.S. Pat. No. 2,676,430 and U.S. Pat. No. 3,163,955. However, such rigid rings are often unable to pass through branches and crevices to reach the entangled plug.

SUMMARY OF THE INVENTION

The invention disclosed herein overcomes the disadvantages in the prior art and provides a convenient, useful, and flexible retriever. Accordingly, there is provided an annular, flexible chain having a cord means secured thereto. The flexible chain is easily fitted over the rod and reel and allowed to descend to the snagged plug. Due to the flexibility of the chain and through operating the cord in a "jiggling" action, in most cases the retriever can be worked through branches or crevices to reach the snagged plug.

There is no tendency of the chain being entangled with the fishing line during its descent to the plug. Moreover, the flexibility of the chain enables it to be easily placed over the rod and reel. It is not necessary, as in many of the prior art devices, to insert the line through slots which could result in the line being damaged.

Low cost is another obvious advantage of this invention. Furthermore, the retriever can easily be stored in a tackle box whereas a rigid ring or many of the prior art devices would require a much larger storage space.

BRIEF DESCRIPTION OF THE DRAWINGS

FIG. 1 is a perspective view showing the retriever being lowered to an entangled fishing plug;

FIG. 2 is a perspective view of the retriever; and

FIG. 3 is a plan view of a modified embodiment of the retriever including a grappler.

DESCRIPTION OF THE PREFERRED EMBODIMENTS

A fishing line 10 having an artificial plug or lure 12 provided with the usual barbed hooks 14 is shown in FIG. 1 with the plug being snagged or entangled on an underwater obstruction 16. The underwater obstruction is shown as being a rock, but it will be appreciated that the underwater obstruction could readily comprise branches, logs, or any other type of underwater vegetation or object.

A retriever 18 is used to untangle and retrieve the snagged plug 12. The construction of the retriever 18 is shown in FIG. 2. The retriever 18 comprises an annular spread circlet of flexible chain 20 having a plurality of interconnected links 22. In FIG. 2, the retriever 18 is illustrated as being made from a piece of metal chain having a pair of free ends 24 and 26. For example, the chain could be approximately 18 inches long and comprise 3/16- or ¼-inch diameter links. A cord 28, preferably of stout construction, such as ⅛-inch polypropylene or nylon cord, is used to secure the free ends 24 and 26 of the metal chain 20 together. The cord 28 has sufficient length to enable it and the chain to descend to the entangled plug. The free end 30 of the cord is preferably secured to a wooden spindle 32, although it could be easily secured to the boat.

FIG. 3 discloses another embodiment of the invention wherein a grappler 34 is secured to the chain 36 at a position 38 on the chain which is preferably diametrically opposed to the connection 40 of the cord to the chain. The grappler 34 comprises a shank 42 secured at one end 44 to the chain by means of wire, rope or a metal link 46. The other end 48 of the shank 42 has a plurality of barbed hooks 50 integrally secured thereto.

It will also be noted that in the embodiment shown in FIG. 3, the chain member 36 is endless and does not have separate ends which are joined together by the cord. Thus, the chain could either be endless as disclosed in FIG. 3 or have its free ends joined together so as to form an effectively continuous, closed-loop member, as shown in FIG. 2. With either embodiment, the retriever could additionally comprise a grappler. Should the grappler be secured to the chain 22 shown in FIG. 2, it would preferably be secured approximately midway between the free ends 24 and 26 of the chain.

In operation, the chain is slipped over the rod and reel (not shown) and then lowered to the entangled plug. Of course, if it is inconvenient or impossible to slip the chain over the rod and reel, the chain member shown in FIG. 2 can be assembled around the fishing line 10. At any rate, the chain is lowered to the vicinity of the entangled plug. The barbed hooks of the plug become engaged in the chain and the plug is withdrawn by pulling on the cord attached to the chain without damage to the plug or line. Of course, in some instances, the barbed hooks 14 on the plug must be straightened if they have been damaged by the obstruction. Because of the flexibility of the chain and by use of a "jiggling" action, the chain can slip through small crevices or branches which would otherwise hinder retrieval attempts. Should the obstruction be such that it is extremely difficult or impossible to lower the chain into engagement with the plug, the grappler can be used to attempt to overturn or remove the obstruction.

While the preferred embodiment of the invention has been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and scope of the claims appended hereto.

What I claim is:

1. A fishing plug retriever comprising:
   an annular spread circlet of flexible chain adapted to pass over a fishing pole and down the fishing line; and
   cord means secured at one end to the chain and adapted to be manipulated at the other end by the fisherman, the cord means enabling the chain to be retrieved to the surface of the water after engagement with the entangled plug.

2. The retriever defined in claim 1 additionally comprising grapple means secured to the chain.

3. The retriever defined in claim 2 wherein the grapple means is secured to the chain at a position on the chain diametrically opposed to the connection of the cord means.

4. The retriever defined in claim 3 wherein the grapple means comprises a shank secured at one end to the chain and having a plurality of barbed hooks integrally secured to the other end of the shank.

5. The retriever defined in claim 1 additionally comprising handle means secured to the free end of the cord member.

6. The retriever defined in claim 1 wherein the circlet comprises an endless chain.

7. The retriever defined in claim 1 wherein the chain comprises a plurality of interconnected links.

8. The retriever defined in claim 1 wherein the circlet comprises a piece of chain, the free ends of which are joined together by the cord means.

9. The retriever defined in claim 8 wherein the grapple means is secured to the chain approximately midway between its free ends.

10. The retriever defined in claim 1 additionally including a grappler having a shank and barbed hooks integrally secured to the shank, the free end of the shank being secured to the chain, and wherein the chain comprises a piece of chain formed of a plurality of interconnected links, the free ends of the chain being joined together by the cord means.